(12) United States Patent
Kaplan

(10) Patent No.: US 8,271,411 B2
(45) Date of Patent: *Sep. 18, 2012

(54) WORKING METHOD FOR TREATMENT OF ABSTRACT OBJECTS (THE THOUGHT-SUBSTANCES) OF THE SYSTEM OF ARTIFICIAL INTELLIGENCE OF A CYBORG OR AN ANDROID FOR THE POINTER-ORIENTED OBJECT ACQUISITION METHOD FOR ABSTRACT TREATMENT OF INFORMATION OF THIS SYSTEM BASED ON A NATURAL LANGUAGE

(76) Inventor: Boris Kaplan, Munich (DE)

( * ) Notice: Subject to any disclaimer, the term of this patent is extended or adjusted under 35 U.S.C. 154(b) by 1291 days.

This patent is subject to a terminal disclaimer.

(21) Appl. No.: 12/007,056

(22) Filed: Jan. 7, 2008

(65) Prior Publication Data

US 2008/0167855 A1    Jul. 10, 2008

(30) Foreign Application Priority Data

Jan. 5, 2007 (DE) .......................... 10 2007 001 208

(51) Int. Cl.
G06F 17/00 (2006.01)
G06N 5/02 (2006.01)
(52) U.S. Cl. ........................................................ 706/46
(58) Field of Classification Search ..................... 706/46
See application file for complete search history.

(56) References Cited

U.S. PATENT DOCUMENTS

| | | | | |
|---|---|---|---|---|
| 7,672,922 | B2 * | 3/2010 | Kaplan | 706/45 |
| 7,886,222 | B2 * | 2/2011 | Bagare et al. | 715/234 |
| 2001/0047346 | A1 * | 11/2001 | Liu et al. | 706/13 |
| 2003/0097806 | A1 * | 5/2003 | Brown | 52/220.1 |
| 2007/0186156 | A1 * | 8/2007 | Bagare et al. | 715/523 |

* cited by examiner

*Primary Examiner* — Michael B Holmes

(57) ABSTRACT

Working method for treatment of abstract objects (the thought-substances) of the system of Artificial Intelligence of a cyborg or an android for the pointer-oriented object acquisition method for abstract treatment of information of this system based on a natural language.

The working method for treatment of abstract objects (the thought-substances) of the system of Artificial Intelligence of a cyborg or an android for the pointer-oriented object acquisition method for abstract treatment of information of this system based on a natural language, in which an abstract object (an thought-substance) is compared with the other abstract objects (the other thought-substances). The working method is impelled by the system by itself. The abstract objects (the thought-substances) and/or the classes of the objects are processed discretely for each abstract object (each thought-substance). The abstract objects and the classes of abstract objects are classified by the system by itself subjective in a natural language only if the class of the objects is a verb in a natural language. With the working method more than ten internal directives of the abstract subjectivity of the system can be used.

10 Claims, 6 Drawing Sheets

Fig. 2
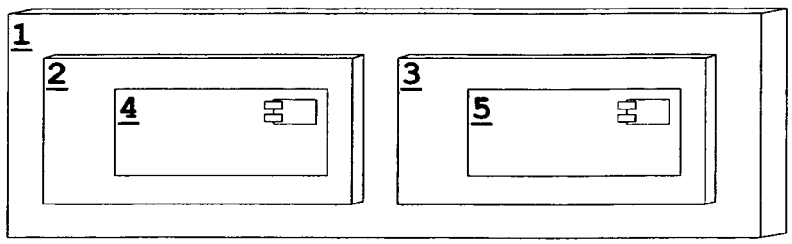
Fig. 3
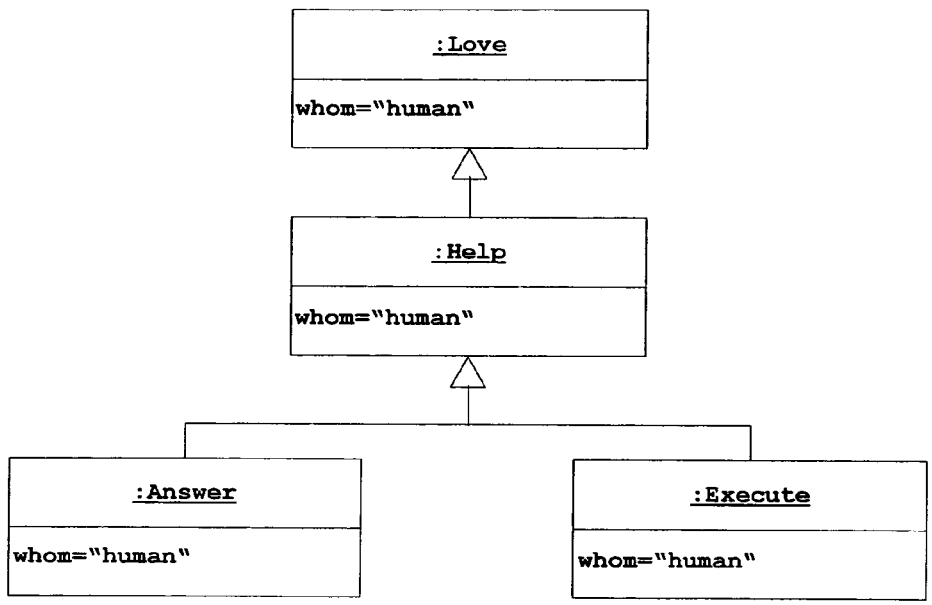
Fig. 4
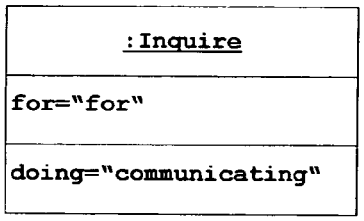
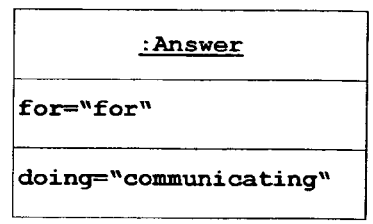
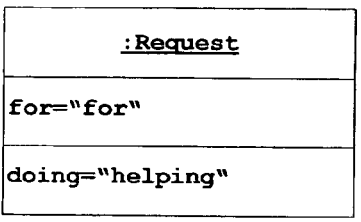
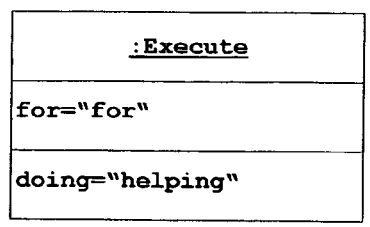

Fig. 5A

| be:Be |
|---|
| who = G-d |
| does = does |
| do = be |
| which = the |
| whom = LORD |
| whose = test4's |
| whom = G-d |
| real timestamp = 2005.11.07 07:15:10 |

| remember:Remember |
|---|
| do = remember |
| real timestamp = 2005.11.07 07:15:32 |

| keep:Keep |
|---|
| to = to |
| do = keep |
| what = holy |
| which = the |
| whose = LORD'S |
| what = day |
| real timestamp = 2005.11.07 07:15:32 |

| kill:Kill |
|---|
| who = test4 |
| shall = shall |
| not = not |
| do = kill |
| real timestamp = 2005.11.07 07:15:54 |

| steal:Steal |
|---|
| who = test4 |
| shall = shall |
| not = not |
| do = steal |
| real timestamp = 2005.11.07 07:16:12 | or

| have:Have |
|---|
| who = test4 |
| shall = shall |
| do = have |
| no = no |
| which = other |
| whom = G-ds |
| besides = besides |
| whom = G-d |
| real timestamp = 2005.11.07 07:21:53 |

| remember:Remember |
|---|
| do = remember |
| which = the |
| what = Sabbat |
| what = day |
| real timestamp = 2005.11.07 07:23:47 |

| keep:Keep |
|---|
| do = keep |
| what = Sabbat |
| what = day |
| what = holy |
| real timestamp = 2005.11.07 07:23:47 |

| murder:Murder |
|---|
| who = test4 |
| shall = shall |
| not = not |
| do = murder |
| real timestamp = 2005.11.07 07:24:07 |

| love:Love |
|---|
| who = test4 |
| shall = shall |
| do = love |
| whose = test4's |
| whom = neighbor |
| as = as |
| whom = test4 |
| which = itself (herself) |
| real timestamp = 2005.11.07 07:25:19 |

Fig. 5B or

| be:Be |
|---|
| where = there |
| does = does |
| do = be |
| no = no |
| whom = G-d |
| but = but |
| whom = Allah |
| real timestamp = 2005.11.07 07:41:10 |

| be:Be |
|---|
| who = Muhammad |
| does = does |
| do = be |
| whose = Allah's |
| what = messenger |
| real timestamp = 2005.11.07 07:43:32 |

| kill:Kill |
|---|
| who = test4 |
| shall = shall |
| not = not |
| do = kill |
| real timestamp = 2005.11.07 07:47:36 |

| made:Make |
|---|
| who = G-d |
| has = has |
| done = made |
| what = life |
| which = sacred |
| real timestamp = 2005.11.07 07:48:01 |

Fig. 6

(This is a private subjective vision. It can also be an error in reasoning.)

You shall have no other G-ds before me, who think in another language. (Their, the G-ds', commandments will not be understood, because they are formulated in another language.)

| have:Have |
| --- |
| who = test4 |
| shall = shall |
| do = have |
| no = no |
| which = other |
| whom = G-ds |
| before = before |
| whom = G-d |
| real timestamp = 2005.11.08 07:07:21 |

| think:Think |
| --- |
| who = G-ds |
| do = do |
| do = think |
| in = in |
| which = another |
| what = language |
| real timestamp = 2005.11.08 07:07:21 |

Fig. 7

The child is a human.
The young man is a human.

| is:Be |
|---|
| which = the |
| who = child |
| does = is |
| how many = a |
| who = human |
| timestamp = Sunday, morning |

| is:Be |
|---|
| which = the |
| what = young |
| who = man |
| does = is |
| how many = a |
| who = human |
| timestamp = Sunday, morning, later |

A child is our future.

| is:Be |
|---|
| how many = a |
| who = child |
| does = is |
| whose = our |
| what = future |
| timestamp = Sunday, morning, still later |

WORKING METHOD FOR TREATMENT OF ABSTRACT OBJECTS (THE THOUGHT-SUBSTANCES) OF THE SYSTEM OF ARTIFICIAL INTELLIGENCE OF A CYBORG OR AN ANDROID FOR THE POINTER-ORIENTED OBJECT ACQUISITION METHOD FOR ABSTRACT TREATMENT OF INFORMATION OF THIS SYSTEM BASED ON A NATURAL LANGUAGE

Working method for treatment of abstract objects (the thought-substances) of the computer system of Artificial Intelligence of a cyborg or an android for the pointer-oriented object acquisition method for tangible treatment of information of this system based on one natural language.

TECHNICAL FIELD

The present invention refers to the working method for treatment of abstract objects (the thought-substances) of the computer system of Artificial Intelligence of a cyborg or an android for the pointer-oriented object acquisition method for tangible treatment of information of this system. The computer system of Artificial Intelligence is based on one natural language.

BACKGROUND OF THE INVENTION

By the European patent (KR 2003000254, DE 10361726), a robot toy with Artificial Intelligence and control method for it are patented. Several patent claims specific for a robot are disclosed by the patent. The Artificial Intelligence of the robot toy is planned for its mechanical control.

From the American patent (U.S. Pat. No. 5,963,663 A), a land mark recognition method for mobile robot navigation is known. Signs (the land marks) are identified as objects in this invention. In the invention, with help of an object recognition apparatus, which works after the principle of the pattern recognition of the neuronal net, a pattern of a signal is differentiated from another pattern. The input signal is decomposed on the red value, the green value, and the blue value for the pattern recognition. The invention makes it possible, that a robot can execute some different technical tasks, e.g. to transport objects in plants. The theme of this invention is not a computer system of Artificial Intelligence of a cyborg or an android. The principal topic of this invention is not a thought substance to the corresponding association substance.

The Publication "View-invariant modeling and recognition of human actions using grammars", A. S. Ogale, A. Karapurkar, Y. Aloimonos, International Conference on Computer Vision (ICCV), Workshop on Dynamical Vision, October 2005, is relevant to the state of the related art. The article is about:

1. an approach for using multiview training videos to automatically create view-independent representations of actions within the framework of probabilistic context-free grammar;

2. that each body-pose is represented implicitly by a family of silhouettes observed in different viewpoints;

3. that the movements of the human body are identified with lower level verbs having direct visual counterparts;

4. that in the framework, each visual verb is described by a short sequence of key body-pose pairs;

5. that it is clear that a particular key body-pose (such as "standing upright") may be common to many body actions;

6. that the body "actions have been given names (like Kneel) for presentation purposes".

The article "Extensible Shallow Parsing for Semantic Nets" Connell, Jonathan H., IBM Technical report, Computer Science, RC 22339, January 2001, pp. 1-6, is relevant to the state of the related art. The article is about:

1. a parser, which transforms written text into a representation from a specific linguistic-based format for semantic networks;

2. that the nets themselves can be implemented in a Web Format (an optional output from the parser), where the network links are true HTML hyperlinks (for Web pages, which represent the nodes of the semantic networks);

3. that the nodes in a semantic network are based on the terms of the open class words, respectively the words: nouns, verbs, adjectives, and adverbs, which are added to languages all the time, and, the links are based on remaining "function" words (such categories include prepositions, determiners, auxiliary verbs, pronouns, and conjunctions, among other), the closed classes, those categories of words, which do not readily admit new members;

4. that the parser looks specifically for words ending in "-ing", "-ed", "-s" (plural or active tense), and "-ly". The parser attempts to restore the word stem to its correct orthographic form and then stores it in a separate open class lexicon for later use.

The publication "Grounding words in perception and action: computational insights", Roy, D., Trends in Cognitive Sciences, Vol. 9, No. 8, August 2005, pp. 389-396, is relevant to the state of the related art. The article is about:

1. "a robotic manipulator, that is able to translate spoken commands, such as 'hand me the blue one on your right', into situated action";

2. "... dynamic interactions between objects. For example, the meaning of 'hand pick up block' is modelled by sequence: table-supports-block, hand-contacts-block, hand-attached-block, hand-supports-block";

3. "an approach that grounds the meaning of verbs, adjectives and nouns referring to physical referents using a unified representational framework. Verbs are grounded in sensory-motor control programs similar to x-schemas. Adjectives, describing object properties are grounded in sensory expectations relative to specific actions. Locations are encoded in terms of body relative coordinates. Objects are represented as bundles of properties tied to a particular location along with encodings of motor affordances for affecting the future location of the bundle. This computational model ... provides a representations that distinguishes and relates the semantics of words for objects (bundles of properties), their properties and action that can taken on them."

4. that "we (human beings, people) cannot expect that such models and systems will directly explain how people think."

The article "Use of natural language for knowledge acquisition: Strategies to cope with semantic and pragmatic variation", Thomas Wetter, Ralf Nüse, IBM J. Res. Develop., Vol. 36, No. 3, May 1992, pp. 435-468, is known. The article is about:

1. the sophisticated natural-language analyzers (NLAs);

2. the expert systems and knowledge acquisition via natural language, or rather "someone (e.g., an expert) knows some relevant facts about a particular domain and tries to describe those facts by using a natural language; someone else (e.g., a system) "understands" those utterances (or written symbols) and, as a consequence, also "knows" the facts described";

3. that "four entities involved in the process: knower 1, who has knowledge coded in some mental language; the source language, which conveys this knowledge to some receiver; knower 2, who is the recipient of the source-language expression (and may be, say, a software product); and finally a domain to which the aforementioned representations refer in one way or another";

4. that "the typical examples of open worlds (the open domains) would arise in medical diagnosis, job applicant assessment, etc"; that "the typical examples of closed worlds (the closed domains) are games such as chess";

5. that "the meaning of "meaning" is completely different in static and dynamic languages; a static language can only cover one aspect of the real world"; that "the target representation must be a formal (static), machine-processable language"; that "in dynamic languages the meaning of an expression is extensionally characterized by its occurrences in all contexts; every new use of an expression adds an occurrence and hence changes its meaning"; that "talking about medical diagnosis, job applicant assessment, etc. in natural language as the prototypical form of a dynamic language is a recommended combination";

6. that "the expert knowledge must be transformed into natural language, and the linguistic expressions resulting from this process must be transformed into "knowledge" again";

7. the rules, e.g. the rule: "If that and that is the case, then that and that is the case", (or rather the rule-based systems, the automated rule-acquisition systems);

8. that "if, however, a system requires prior knowledge in order to understand a rule formulated in natural language, all knowledge cannot be communicated via natural language";

9. that "it is very difficult to convey common-sense knowledge via natural language, in addition, human beings do not acquire it in this manner, either"; that the "common-sense knowledge in an NLA+ must be either "programmed" or acquired using media other than natural language";

10. that the "generic sentences can be misunderstood", that "a sentence such as "The jay has a special beak" has the same surface structure as "The jay has a broken wing"; the first sentence, however, is a generic one, which would have to be analyzed as a universally quantified conditional (and thus constitutes "knowledge" about jays)" (in general), "while the second sentence describes an event" (to a specific jay); that "a solution of those problems is still not in sight".

From the American patent application (US 20070106127 A), an automated patient monitoring and counseling system is known. The system is based on a natural telephone conversation. The invention uses a computerized system to analyze diagnostic parameters received from a remote site over a public communication network (patient's vital sign measurements such as blood pressure, glucose level and pulse rate) and to feed back pre-recorded therapeutic messages to patients suffering from a wide range of physiological and psychological conditions. The diagnostics and assessments are used to selectively retrieve from a data bank of pre-recorded messages, feedback advice, past performance charts and motivating audiovisual-programs. If warranted, health professionals are alerted so that they can intervene and contact the patient directly. The theme of the invention is not a computer system of Artificial Intelligence of a cyborg or an android. This patent application does not refer to the working method for treatment of abstract objects (of the thought-substances to the corresponding association substances) of the computer system of Artificial Intelligence of a cyborg or an android.

From the American patent (U.S. Pat. No. 5,509,810), an interactive neonatal resuscitation training simulator and method, respectively an infant android of life-like appearance and response, is known. The simulator and method provide a trainee with a life-like simulation of a resuscitation process on a newborn infant, and in particular, a life-like simulation of what an attending physician would experience while resuscitating a newborn infant at a resuscitation station within a hospital's delivery room. The adjustment in the android simulated condition mimics a predetermined human reaction to resuscitation activity such as that performed on the android by the trainee. In enhanced embodiments, the android is equipped with life-like human appearance and life-like human responses. Further, a resuscitation workstation having the appearance of a conventional resuscitation workstation is employed to present a more real-life simulation to the trainee. The principal topic of the invention is not a computer system of Artificial Intelligence of a cyborg or an android. This patent, which employing the baby like infant-android during the first month after birth, is not about the working method for treatment of abstract objects (of the thought-substances to the corresponding association substances) of the computer system of Artificial Intelligence of a cyborg or an android.

The article "Interfacing Silicon Nanowires with Mammalian Cells", Woong Kim, Jennifer K. Ng, Miki E. Kunitake, Bruce R. Conklin, Peidong Yang, ACS PUBLICATIONS, Journal of the American Chemical Society (JACS), Published on Web: May 22, 2007, pp 7228-7229, is relevant to the state of the related art. This article is about an example of the interface from a computer system of Artificial Intelligence to a human body.

1. "We present the first demonstration of a direct interface of silicon nanowires with mammalian cells such as mouse embryonic stem (mES) cells and human embryonic kidney (HEK 293T) cells without any external force. The cells were cultured on a silicon (Si) substrate with a vertically aligned SiNW array on it. The penetration of the SiNW array into individual cells naturally occurred during the incubation. The cells survived up to several days on the nanowire substrates. The longevity of the cells was highly dependent on the diameter of SiNWs. Furthermore, successful maintenance of cardiac myocytes derived from mES cells on the wire array substrates was observed, and gene delivery using the SiNW array was demonstrated. Our results suggest that the nanowires can be potentially utilized as a powerful tool for studying intra- and intercellular biological processes."

The project "BBCI—An interface between brain and computer" is relevant to the state of the related art. "Project directors: Prof. Dr. Klaus-Robert Müller, Prof. Dr. Gabriel Curio, Dr. Benjamin Blankertz."

1. "For several years, research groups in Europe and the USA have been working on systems which allow for a direct dialog between man and machine. To this end, a "Brain Computer Interface" (BCI) has been developed. Cerebral electric activity is recorded via the electroencephalogram (EEG): electrodes, attached to the scalp, measure the electric signals of the brain. These signals are amplified and transmitted to the computer, which transforms them into device control commands. The crucial requirement for the successful functioning of the BCI is that the electric activity on the scalp surface already reflects motor intentions, i.e., the neural correlate of preparation for hand or foot movements. The BCI detects the motor-related EEG changes and uses this information, for example, to perform a choice between two alternatives: the detection of the preparation to move the left hand leads to the choice of the first, whereas the right hand intention would lead to the second alternative. By this means it is possible to operate devices which are connected to the computer; such a communication can even be realised via the internet."

2. "The project (BMBF Förderzeichen 01KO0121, 01IBB02A/B, 01IBE01A/B), which is supported by the ministry for education and research (Bundesministerium far Bildung and Forschung, BMBF), comprises the development of EEG-driven systems for computer-aided working environments. These systems will, for instance, allow for the control of a mouse pointer by means of brain waves. Furthermore, medical tools are being created for patients suffering from amyotrophia or quadriplegia."

3. "This research program is done in a cooperation between the Berlin Institute of Technology, Machine Learning Laboratory (Prof. Dr. Klaus-Robert Müller and Dr. Benjamin Blankertz), Fraunhofer FIRST institute, research group IDA (Intelligent Data Analysis) (Prof. Dr. Klaus-Robert Müller and Dr. Benjamin Blankertz), and the neurophysics research group, Department of Neurology at Campus Benjamin Franklin, Charité—University Medicine, Berlin, (Prof. Dr. Gabriel Curio)."

The "BrainGate™ Neural Interface System", a product of Cyberkinetics, Inc. is relevant to the state of the related art. The interface was described, for example, in article "Industry Shorts—Nexus: Cyberkinetics Initiates Pilot Study of BrainGate Neural Interface System", Robotics Trends, Robots and Robotics Technology News, Information and Analysis, Published on Web: Wednesday, Apr. 21, 2004-07:23 PM, Copyright 2004 Business Wire, Inc.; Copyright© 2002 LexisNexis, a division of Reed Elsevier Inc.

1. "FOXBOROUGH, Mass., Apr. 20, 2004-Cyberkinetics, Inc. today announced that it has initiated a pilot study of the investigational BrainGate™ Neural Interface System."

2. "About the BrainGate™ System:
Cyberkinetics' BrainGate Neural Interface System is a proprietary, investigational brain-computer interface device that consists of an internal neural signal sensor and external processors that convert neural signals into an output signal under the person's own control. The sensor consists of a tiny chip about the size of a baby aspirin, with one hundred electrode sensors each thinner than a hair that detect brain cell electrical activity. The sensor will be implanted on the surface of the area of the brain responsible for movement, the primary motor cortex. The sensor will be connected by a small wire to a pedestal which will be mounted on the skull, extending through the scalp. The pedestal will be connected by a cable to a cart containing several computers and monitor which will enable the study operators to determine how well a patient can control their neural output."

3. "About Cyberkinetics, Inc.
Cyberkinetics is a leader in neurotechnology, an emerging field driven by advances in neuroscience, computer science, and engineering that promises to revolutionize the medical treatment of nervous system dysfunction. Cyberkinetics' first product, BrainGate™, is designed to give severely paralyzed patients a long-term, direct brain-computer interface for the purpose of communication and control of a computer. Cyberkinetics' intellectual property features key technologies licensed from Brown University, the Massachusetts Institute of Technology, Emory University, and the University of Utah. Cyberkinetics is headquartered in Foxborough, Mass. and conducts engineering and research in Salt Lake City, Utah."

The three interfaces are some examples of the interfaces of the computer system of Artificial Intelligence to the human body, or rather to the cyborg body. That means that the computer system of Artificial Intelligence becomes the computer system of Artificial Intelligence of a cyborg with one of these interfaces.

From my patent application (DE 10 2005 050 579.1, U.S. Ser. No. 11/355,287, IL 174910), a computer system and the working method of this computer system of Artificial Intelligence of a cyborg or an android, are known. This patent application is about a computer system as the computer system of Artificial Intelligence of a cyborg or an android which is based on one natural language. The computer system includes the hardware devices, the sensors groups, the interfaces, the senses input receiver, the senses output transmitter, the database, the cyborg-interpreter. In this patent application a signal-reaction of a cyborg or an android, an association of a cyborg or an android, a thought of a cyborg or an android are physically substantiated in the computer system of Artificial Intelligence of a cyborg or an android. The natural language which the computer system uses with its working method is interpreted by the computer system in an object-oriented way. These objects and/or the classes from the objects are no elements of a computer language. The computer system functionality is based on these objects, which are unique. These objects are defined relative to time, but not uniquely. These objects generated by the one natural language can represent some more reactions in each case from some more sensors groups than five reactions of five sense organs. In the application, some different approaches of the working method in a natural language are described as well. For the working method in another natural language, the computer system uses the references. The abstract objects of a computer system of Artificial Intelligence of a cyborg or an android in this patent application represent the thought substances of a cyborg or an android.

From the American patent (U.S. Pat. No. 7,672,922 B2) and the patent applications (DE 10 2006 052 141 A1, IL 182773), a pointer-oriented object acquisition method for abstract treatment of information of the computer system of Artificial Intelligence of a cyborg or an android is known. That pointer-oriented object acquisition method for abstract treatment of information of the computer system of Artificial Intelligence of a cyborg or an android is based on one natural language. That patent application is about, that by the pointer-oriented object acquisition method for abstract treatment of information of the computer system of Artificial Intelligence of a cyborg or an android which is based on one natural language three pointers are created in the computer main memory (in RAM (Random Access Memory)) of the computer system of Artificial Intelligence of a cyborg or an android in the natural language, in which the computer system is working at this timeframe, at run-time, in a way of the thinking paradigm of the class-based model of OOP, or rather of the programming language C++, as in instantiating an object on the Heap (the freely available memory storage area by dynamic memory allocation). In this way, the subjective object, the associative object and the abstract object of the computer system of Artificial Intelligence of a cyborg or an android are instantiated and are initialized. With those objects, which are implemented in the one natural language, one can access to, i.e. manipulate with the element variables, i.e. with the data elements, of a class of the classification tree of the computer system of Artificial Intelligence of a cyborg or an android. With the subjective object, a received signal-reaction of a cyborg or an android is physically substantiated in the computer system of Artificial Intelligence of a cyborg or an android, in the sense of building a substance of the signal-reaction. With the associative object, an association of a cyborg or an android is physically substantiated in the computer system of Artificial Intelligence of a cyborg or an android, in the sense of building a substance of the association. With the abstract object, a thought of a cyborg or an android is physically substantiated in the computer system of Artificial Intelligence of a cyborg or an android, in the sense of building a substance of the thought.

Further, the humanoid robots are known which can move in human or animal way.

For example, ASIMO is a robot developed by company Honda which can move in human way.

The AIBO of company Sony, a robot-dog, which can be programmed. In addition, he can run, see, show his feelings and speak the predefined words.

The QRIO of company Sony. It is a humanoid robot itself, which can move in human way. He can do everything that the AIBO can do. He can also speak about something, or have a conversation. Besides, the speech recognition is used and the predefined response scenarios with many thousands of words are prepared. In addition, the QRIO is very expensive.

Further, the predicate logic is worldwide known. It plays a big role in informatics for the programming of expert's systems and Artificial Intelligence. It is based on the logical predicate, which can take part as either a property or a relation between entities, but not as an action. The predicate is considered as not object-oriented. Neither the subject term nor the predicate term are considered relative to time.

Some terms need to be defined for describing the present invention. The terms and their definitions include:

1. Android:

1.1. "Android der, -en/-en, Androide der, -n/-n ein zu bestimmten Tätigkeiten fähiger→Automat in Menschengestalt" (An android is → an automatic machine which is capable to the determined activities in the human shape) (The encyclopedia "Brockhaus-Enzyklopädie": in 24 vol.-19, fully revised Edition, F. A. Brockhaus GmbH, Mannheim 1986, ISBN 3-7653-1101-4/3-7653-1201-0; page 562).

1.2. "An android is an artificially created robot, an automation, that resembles a human being . . . in . . . behavior. The word derives from the Greek andr-," meaning "man, male", and the suffix-eides, used to mean "of the species alike" (from eidos "species")."—Wikipedia, the free encyclopedia.htm (http://en.wikipedia.org/wiki/Android).

1.2.1. Unlike the terms robot (a "mechanical" being) and cyborg (a being that is partly organic and partly mechanical), the word android has been used in literature and other media to denote several different kinds of artificially constructed beings:

1.2.1.1. a robot that closely resembles a human;

1.2.1.2. a cyborg that closely resembles a human;

1.2.1.3. an artificially created, yet primarily organic, being that closely resembles a human.

2. Cyborg:

2.1. "Cyborg ['saibo:g; Kw. aus engl. cybernetic organism >kybernetisches Lebenswesen<] der, -s/-s, in der Futurologie Bez. für einen Menschen, in dessen Körper techn. Geräte als Ersatz zur Unterstützung nicht ausreichend leistungsfähiger Organe (z.B. für länge Raumflüge) integriert sind" (Cyborg [from engl. cybernetic organism] in futurology a term for a human being in whose body some technical devices are integrated as substitution for support of the insufficiently efficient organs (for example for long space-flights)) (The encyclopedia "Brockhaus-Enzyklopädie": in 24 vol.-19., fully revised Edition, F. A. Brockhaus GmbH, Mannheim 1988, ISBN 3-7653-1105-7/3-7653-1205-3; page 67).

2.2. "The term cyborg, a portmanteau of cybernetic organism, is used to designate an organism which is a mixture of organic and mechanical (synthetic) parts . . . "—Wikipedia, the free encyclopedia.htm (http://en.wikipedia.org/wiki/Cyborg);

2.2.1. Generally, the aim is to add to or enhance the abilities of an organism by using technology, i.e. a man-machine mixture;

2.2.2. "Isaac Asimov's short story "The Bicentennial Man" explored cybernetic concepts . . . His explorations lead to breakthroughs in human medicine via artificial organs and prosthetics." As well as to the " . . . artificial positronic brain . . . ";

2.2.3. "The term "cyborg" is used to refer to a man or woman with bionic, or robotic, implants."

3. Strong Artificial Intelligence:

3.1. In the philosophy of artificial intelligence, strong AI is the claim that some forms of artificial intelligence can truly reason and solve problems; strong AI states that it is possible for machines to becomes sapient, or self-aware, but may or may not exhibit human-like thought processes.—Wikipedia, the free encyclopedia.htm (http://en.wikipedia.org/wiki/strong_AI);

3.2. " . . . according to strong AI, the computer is not merely a tool in the study of the mind; rather, the appropriately programmed computer really is a mind" (J. Searle in Minds, Brains and Programs. The Behavioral and Brain Sciences, vol. 3, 1980).

4. "The mind is the term most commonly used to describe the higher functions of the human brain . . . —Wikipedia, the free encyclopedia.htm (http://en.wikipedia.org/wiki/Mind).

5. In psychology . . . two concepts or stimuli are associated when the experience of one leads to the effects of another, due to repeated pairing. This is sometimes called Pavlovian association for Ivan Pavlov's pioneering of classical conditioning.—Wikipedia, the free encyclopedia.htm (http://en.wikipedia.org/wiki/Association_%28psychology%29).

6. Thought:

6.1. "The thought is a direct sense shape of thinking . . . the thought describes a result, a product of the thinking-process."—Wikipedia, the free encyclopedia.htm (http://de.wikipedia.org/wiki/Gedanke).

6.2. "It (thought) is an element/instance of thinking and is used as its synonym." "In philosophy, thought is also a synonym for idea."—Wikipedia, the free encyclopedia.htm (http://en.wikipedia.org/wikif/Thought_(disambiguation)).

7. Abstract thinking:

7.1. "abstraktes Denken, Denkprozess, durch den sich losgelöst (abstrahiert) von komplexen Sachverhalten bestimmte Aspekte verallgemeinern lassen" (abstract thinking, thinking process, with which the particular aspects unbound (abstracted) from the complex facts can be generalized) (The lexicon "Lexikon der Psychologie": in 5 vol, editor: Gerd Wenninger—Heidelberg; Berlin: Spektrum, Akademischer Verlag GmbH, Heidelberg 2000, vol. 1. A to E, ISBN 3-8274-0312-X; page 9).

7.2. "Abstraktion die, -/-en, Denkvorgang bei der Bildung von Begriffen und Gesetzen, gekennzeichnet durch das stufenweise Heraussondern bestimmter Merkmale in der Absicht, das Gleichgebliebene und Wesentliche versch. Gegenstände zu erkennen; auch das Ergebnis des A.-Prozesses. Bei der generalisierenden A. werden die relevanten gemeinsamen Merkmale versch. Gegenstände oder Klassen herausgehoben, wobei von den unwesentlichen, sich unterscheidenden abgesehen wird" (Abstraction, thinking process, characterized by gradual separating particular attributes, during the definition of terms and laws, with intent to identify the unchanged and significant of particular objects; also the result of the A.-process. With the generalized A., the relevant general attributes of particular objects or classes are selected, and the irrelevant different attributes are irrespective.) (The encyclopedia "Brockhaus-Enzyklopädie": in 24 vol.-20., fully revised Edition, F. A. Brockhaus GmbH, Mannheim 1996, vol. 1. A-AP, ISBN 3-7653-3100-7/3-7653-3101-5; page 84).

7.3. "Abstraktion, auf zufällige Einzelheiten verzichtende, begrifflich zusammengefaßte Darstellung; Vorgang und Ergebnis des Auswählens eines ganz bestimmten Aspekts eines komplexen Sachverhaltes, um diesen zu klassifizieren, zu bewerten und zu verallgemeinern" (Abstraction, conceptually generalized definition, abstaining from irrelevant details; process and result of selection of a quite particular aspect of a complex fact, in order to classify, to estimate and to generalize) (The lexicon "Lexikon der Psychologie": in 5 vol, editor: Gerd Wenninger—Heidelberg; Berlin: Spektrum, Akademischer Verlag GmbH, Heidelberg 2000, vol. 1. A to E, ISBN 3-8274-0312-X; page 9).

7.4. "Abstraction is the process or result of generalization by reducing the information content of a concept or an observable phenomenon, typically in order to retain only information which is relevant for a particular purpose. For example, abstracting a leather soccer ball to a ball retains only the information on general ball attributes and behaviour."—Wikipedia, the free encyclopedia.htm (http://en.wikipedia.org/wiki/Abstract_thinking).

8. Capacity for abstract thought:

8.1. "Abstraktionsvermögen → . . . : das; -s; -(geistige) Fähigkeit, aus dem Besonderen etw. Allgemeines abzuleiten" (Capacity for abstract thought → . . . : (intellectual) ability to derive something general from the particular) (The dictionary "Deutsches Wörter-Buch"; Karl-Dieter Bünting, Isis Verlag AG, 1996, Chur/Schweiz, page 38).

9. Telepathy:

9.1. "Telepathy (from the Greek τ□λε, "distant"; and πάθεια, patheia, "feeling") is defined in parapsychology as the paranormal acquisition of information concerning the thoughts, feelings or activity of another person."—Wikipedia, the free encyclopedia.htm (http://en.wikipedia.org/wiki/Telepathy).

9.2. "The German Term for Telepathy is the Thoughts-Transfer."—Wikipedia, the free encyclopedia (http://de.wikipedia.org/wiki/Telepathie).

10. "The most popular and developed model of OOP is a class-based model, as opposed to an object-based model. In this model, objects are entities that combine state (i.e., data), behavior (i.e., procedures, or methods) and identity (unique existence among all other objects). The structure and behavior of an object are defined by a class, which is a definition, or blueprint, of all objects of a specific type . . . "—Wikipedia, the free encyclopedia.htm (http://en.wikipedia.org/wiki/Class-based_OOP).

11. Pointer:

11.1. "A pointer identifies in computer science a special class of variables, that refer to another memory space or the variables itself . . . . The referred memory space contains either data (object, variable) or the program code."—Wikipedia, the free encyclopedia.htm (http://de.wikipedia.org/wiki/Zeiger).

11.2. In C and C++, pointers are variables that store addresses (of the computer memory) and can be NULL. A NULL-Pointer has a reserved value, often but not necessarily the value zero, indicating that it refers to no object. (The NULL-Pointer stores the address of a NULL-Object, i.e. points to nothing). A pointer is a simple implementation of the general reference data type (although it is quite different from the facility referred to as a reference in C++).—Wikipedia, the free encyclopedia.htm (http://en.wikipedia.org/wiki/Pointer).

12. Reference:

12.1. "A reference represents an identification of an object . . . . Therewith, a reference represents an alias name to an entity."—Wikipedia, the free encyclopedia.htm (http://de.wikipedia.org/wiki/Referenz_%28Programmierung%29).

12.2. A reference is an alias-name. When a reference is created, it will be initialized with the name of another object, with the target. From this moment, the reference will be like an alternative name for the target, and everything that will be applied to the reference will, in fact, refer to the target. (The book, C++ in 21 Tagen", Jesse Liberty, 2000 by Markt&Technik Verlag (Publishing), ISBN 3-8272-5624-0, the authorized translation of the American original edition: "Teach Yourself C++ in 21 Days".COPYRGT. 1999 by SAMS Publishing, page 290).

14. Object:

14.1. Therewith . . . the new objects are created on the heap (the freely available memory storage area by dynamic memory allocation). The . . . given back address (of the memory storage area) will be stored in the pointer. (The book "C++ in 21 Tagen", Jesse Liberty, 2000 by Markt&Technik Verlag (Publishing), ISBN 3-8272-5624-0, the authorized translation of the American original edition: "Teach Yourself C++ in 21 Days".COPYRGT. 1999 by SAMS Publishing, pages 263, 264, 267, 285).

14.2. "Der Operator new erzeugt solche Objekte, und der Operator delete kann benutzt werden, um sie zu zerstören. Objekte, die durch new angelegt wurden, werden als »im Freispeicher«befindlich bezeichnet (und such als »Heap-Objekte«oder »im dynamischen Speicher angelegt«)" (The operator "new" creates such objects, and the operator "delete" can be used to destroy them. The objects, that were instantiated with "new", are defined as allocated »in the freely available memory storage« (as well as »Heap-Objects« or »that are created by dynamic memory allocation«)) (The book "Die C++—Programmiersprache"; 3. Edition; Bjarne Stroustrup (Der Erfinder von C++); Addison Wesley Longman Verlag (Publishing); 1998; ISBN 3-8273-1296-5; page 136; (the American original edition: "The C++—Programming Language", Bjarne Stroustrup (The inventor of C++), Third Edition, Addison-Wesley, Reading, ISBN 0-201-88954-4.COPYRGT. 1997 AT&T)).

This invention, as also my inventions: "Computer system in which a received signal-reaction of the computer system of Artificial Intelligence of a cyborg or an android, an association of the computer system of Artificial Intelligence of a cyborg or an android, a thought of the computer system of Artificial Intelligence of a cyborg or an android are substantiated and the working method of this computer system of Artificial Intelligence of a cyborg or an android", patent application (DE 10 2005 050 579.1, U.S. Ser. No. 11/355,287, IL 174910), and "Pointer-oriented object acquisition method for abstract treatment of information of the computer system of AI of a cyborg or an android which is based on one natural language", patent application (DE 10 2006 052 141 A1, IL 182773), and the American patent (U.S. Pat. No. 7,672,922 B2), is based on one of my scientific discoveries, and/or a theory of subjectivity, with the subject—"Human intelligence. Natural intelligence. The functionality of the human (natural) intelligence."

The three inventions make it possible either the conversion of a humanoid robot into an android or the conversion of a human being into a cyborg with the artificial component, or with the artificial part,—the Artificial Intelligence.

An enormous gigantic job potential, which includes thousands of highly qualified, highly motivated, high-quality jobs in the different branches, is hidden behind this invention. For example:

1. cyborg (android)—hardware development;
2. cyborg (android)—software development;
3. cyborg (android)—production;
4. cyborg (android)—pedagogy;

5. cyborg (android)—education;
6. human (cyborg (android))—medicine;
7. human (cyborg (android))—fight against crime;
8. human (cyborg (android))—counterterrorism . . .

Another strategically or political, also negative use, (if the negative internal directives of the abstract subjectivity are used), is not to exclude, for example, a cyborg assassin as a suicide bomber. It should always be taken into consideration, as well as the means of protection should be planed in advance.

OBJECTIVES OF THE INVENTION

The way of posing a problem of this invention is:
1. to realize a working method, with which the computer system of Artificial Intelligence of a cyborg or an android is impelled by itself to react to every incoming abstract object;
2. to implement a working method, with which the computer system of Artificial Intelligence of a cyborg or an android will decide whether the incoming abstract object will be treated by the computer system;
3. to implement a working method, with which the computer system of Artificial Intelligence of a cyborg or an android will decide how the computer system will treat the incoming abstract object;
4. to substantiate that the strong Artificial Intelligence is no illusion, but it is reality;
5. to develop the strong Artificial Intelligence peacefully, positively, as friendly towards human, as also to plan the means of protection for a negative development in advance.

BRIEF SUMMARY OF THE INVENTION

The innovative solution accomplished by the present invention is that the incoming abstract object is compared in a permanent rerun-mode with the internal directives of the abstract subjectivity. The rerun-mode can be implemented with a loop, a thread, an application and/or a hardware device, for example, a microcontroller or another chip. The internal directives of the abstract subjectivity of the computer system of Artificial Intelligence of a cyborg or an android are also, naturally, the abstract objects, as well as they are defined by the computer system itself, for example, as a result of a communication with the representative of the internal directives. If the equivalence of the incoming abstract object is true to a group of the internal directives, or to objects derived from the directives of the group, the incoming abstract object will be treated accordingly. If it is not true, the equivalence of the incoming abstract object will be checked to another group of the internal directives. If it is also not true, the next test will come into question. And so far up to the end of the group of the directives. Of course, a "default" scenario can also be implemented, for example, with "nothing to do". The next rerun-iteration comes either with timeout or as a reaction to a message that a new abstract object has arrived. Thus, the computer system of Artificial Intelligence of a cyborg or an android is impelled by itself to react to every incoming abstract object.

The test can be implemented in the following way:

The equivalence test of the incoming abstract object, which contains a question, with a group of the internal directives, which contains an object "Love.whom" of the class "Love" as a directive, is delegated to the equivalence test of the incoming abstract object with the object "Help.whom" of the class "Help", (because the class "Help" is derived from the class "Love" in the classification tree of the computer system of Artificial Intelligence of the cyborg or the android). If the equivalence test is true, and if all other directives of the group are equal to the incoming abstract object, it will guide to a treatment-scenario. Thus, the computer system of Artificial Intelligence of the cyborg or the android will decide whether an abstract object is to be treated and how the abstract object is to be handled within the bounds of the determined treatment mode.

The treatment mode itself is determined with the polymorphism of the classes classification of the computer system of Artificial Intelligence of the cyborg or the android. The common attribute, doing="communicating", comes into question by the determination. As a result, an answering-scenario will be issued. Thus, the computer system of Artificial Intelligence of the cyborg or the android decides how (with which treatment mode) the computer system will treat the incoming abstract object.

This decision can be checked with the classification tree of the computer system of Artificial Intelligence of the cyborg or the android. (Whether the class "Answer" is really derived from class "Help").

The equivalence test of the incoming abstract object, which contains a request, passes by the same logic to the treatment with an executing-scenario.

The equivalence test of the incoming abstract object, which contains a command, leads by the same logic to the treatment with an executing-scenario.

The equivalence test of the incoming abstract object, which contains a statement, guides by the same logic to the treatment with a noticing-scenario (a perceiving-scenario).

Etc . . .

It is a matter of course, an abstract object can also come in from the cyborg or the android him/herself (itself, for example, during a thinking-scenario.

(It is repeated because it is very important.)

Another strategically or political, also negative use, (if the negative internal directives of the abstract subjectivity are used), is not to exclude, for example, a cyborg assassin as a suicide bomber. It should always be taken into consideration, as well as the means of protection should be planed in advance.

Other details, features and advantages result from the execution examples shown in the drawings, and from the independent and dependent claims. The execution examples follow the description.

BRIEF DESCRIPTION OF THE DRAWINGS

In the drawings:

FIG. 2 is an illustration of the hardware deployment diagram of the computer system of Artificial Intelligence of a cyborg or an android.

FIG. 3 shows a fragment from the classification tree of the computer system of Artificial Intelligence of the cyborg or the android.

FIG. 4 shows a fragment from the polymorphism of the classes classification of the computer system of Artificial Intelligence of the cyborg or the android.

FIG. 5 illustrates some examples of the internal directives of the abstract subjectivity of the computer system of Artificial Intelligence of a cyborg or an android.

FIG. 6 is an illustration of my subjective understanding of the internal directive No. 1 of the abstract subjectivity of the computer system of Artificial Intelligence of a cyborg or an android. It can also be an error in reasoning.

FIG. 7 illustrates an example of usage of working method for treatment of abstract objects (the thought-substances) of the computer system of Artificial Intelligence of a cyborg or an android for the pointer-oriented object acquisition method for tangible treatment of information of this system based on a natural language.

DETAILED DESCRIPTION OF THE INVENTION

Figure 1:
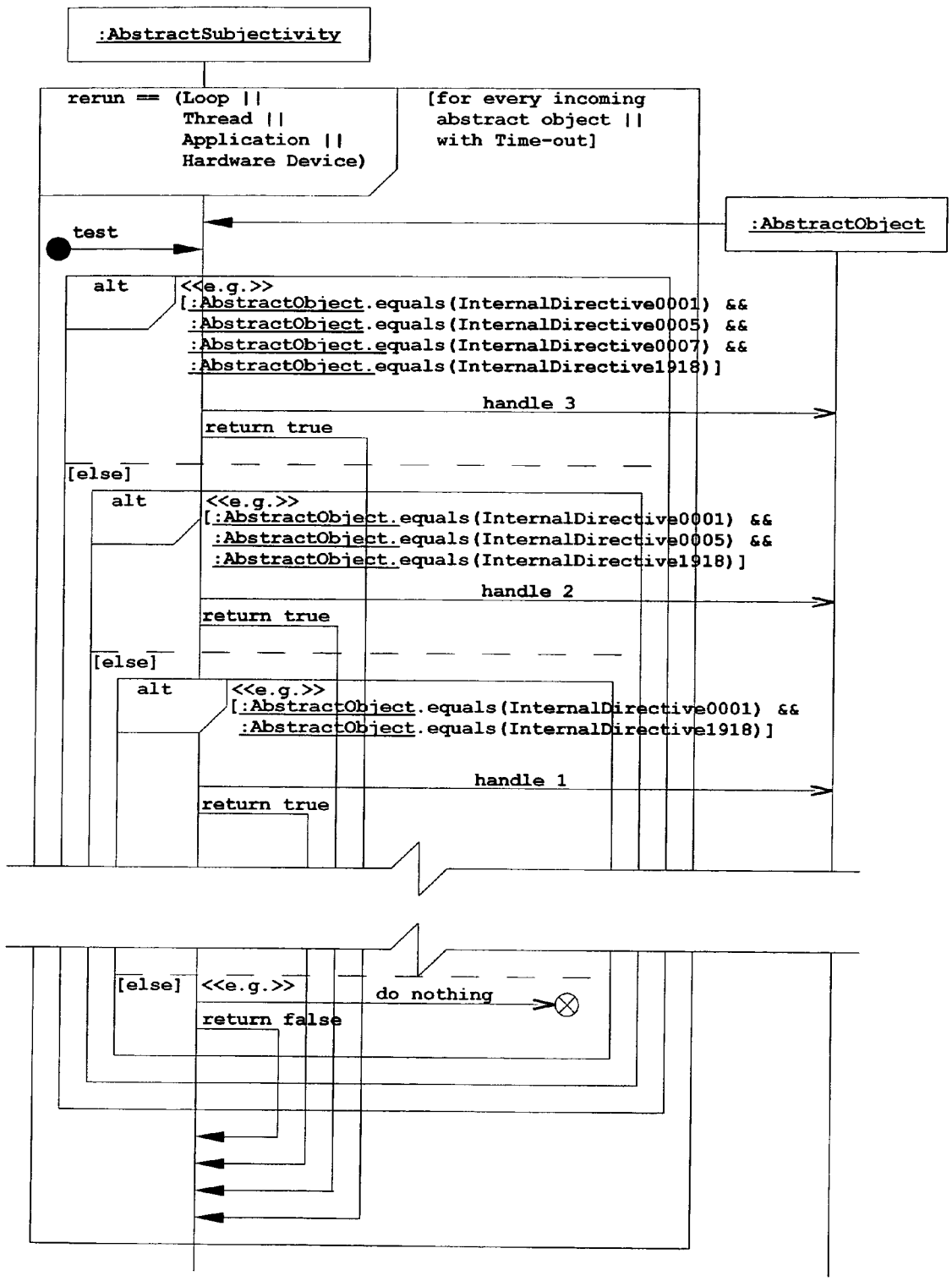
FIG. 1 illustrates the working method for treatment of abstract objects of the computer system of Artificial Intelligence of a cyborg or an android.

FIG. 1 illustrates the working method for treatment of abstract objects of the computer system of Artificial Intelligence of a cyborg or an android. The incoming abstract object is tested during a permanent rerun-mode with the internal directives of the abstract subjectivity. The rerun-mode can be realized as a loop, a thread, an application and/or a hardware device, for example, a microcontroller or another chip. The internal directives of the abstract subjectivity of the computer system of Artificial Intelligence of a cyborg or an android are, naturally, also the abstract objects, as well as they can be defined by the computer system itself, for example, as a result of a communication with the representative of the internal directives. If the incoming abstract object is equal to a group of the internal directives, or to objects derived from the directives of the group, it will be treated accordingly. If it is not equal, the equivalence of the incoming abstract object will be checked to another group of the internal directives. If it is also not true, the next test will come into question. And so far up to the end of the group of the directives. Of course, a "default" scenario can also be implemented, for example, with "nothing to do". The next rerun-iteration comes either with timeout or as a reaction to a message that a new abstract object has arrived. Thus, the computer system of Artificial Intelligence of a cyborg or an android is impelled by itself to react to every incoming abstract object.

FIG. 2 is an illustration of the hardware deployment diagram of the computer system of Artificial Intelligence of a cyborg or an android. On the hardware devices node 1 of the computer system of Artificial Intelligence of a cyborg or an android are installed a hardware devices node 2 of the associative subjectivity 4 and a hardware devices node 3 of the abstract subjectivity 5. Hardware devices nodes are realized for the test and demo purposes as different computers. The periphery devices as well as the microcontrollers or another chips will be used for production.

FIG. 3 shows a fragment from the classification tree of the computer system of Artificial Intelligence of the cyborg or the android. (The classification tree is shown with the classification tree of the anonymous objects in order to visualize the values of the attributes). The equivalence test of the incoming abstract object, which contains a request, with a group of the internal directives, which contains an object "Love.whom" of the class "Love" as a directive, is delegated to the equivalence test of the incoming abstract object with the object "Help.whom" of the class "Help", (because the class "Help" is derived from the class "Love" in the classification tree of the computer system of Artificial Intelligence of the cyborg or the android). If the equivalence test is true, and if all other directives of the group are equal to the incoming abstract object, it will guide to a treatment-scenario. According to the classification tree will be decided whether an abstract object is to be treated.

(After the treatment mode, with the scenario shown in FIG. 4, is chosen, according to the classification tree and the scenario shown in FIG. 1, the treatment mode handle, for example, handle 1 (respectively handle "n") will be selected, respectively, it will be selected, how the abstract object is to be handled within the bounds of the determined treatment mode. In practice, for example, by an executing/answering-scenario after "Thank you" in addition, will be said: "You are welcome" or by an answering-scenario will be answered in detail, or also by an executing-scenario will be executed explicitly (exclusively)).

FIG. 4 shows a fragment from the polymorphism of the classes classification of the computer system of Artificial Intelligence of the cyborg or the android. (The classes are shown with the anonymous objects in order to visualize the values of the attributes). The treatment mode itself is determined with the polymorphism of the classes classification of the computer system of Artificial Intelligence of the cyborg or the android. The common attribute, for example, doing="helping", comes into question for taking the decision. As a result, an executing-scenario will be issued. In this way, the computer system of Artificial Intelligence of the cyborg or the android decides how (with which treatment mode) the system will treat the incoming abstract object.

FIG. 5 illustrates some examples of the internal directives of the abstract subjectivity of the computer system of Artificial Intelligence of a cyborg or an android. These internal directives form several groups of the internal directives. It can be that more than ten internal directives are used with the working method of the computer system of Artificial Intelligence of a cyborg or an android.

FIG. 6 is an illustration of my subjective understanding of the internal directive No. 1 of the abstract subjectivity of the computer system of Artificial Intelligence of a cyborg or an android. It can also be an error in reasoning.

FIG. 7 illustrates an example of usage of working method for treatment of abstract objects (the thought-substances) of the computer system of Artificial Intelligence of a cyborg or an android for the pointer-oriented object acquisition method for tangible treatment of information of this system based on a natural language. In an episode of the science fiction film "I, Robot", directed by Alex Proyas, released on Jul. 16, 2004, distributed by 20th Century Fox, attributed to Isaac Asimov's book of the short stories with the same name, published in 1950, is represented that a robot, that behaves according to Asimov's robot laws, the Three Laws of Robotics:

1. a robot may not injure a human being or, through inaction, allow a human being to come to harm;

2. a robot must obey orders given it by human beings except where such orders would conflict with the First Law;

3. a robot must protect its own existence as long as such protection does not conflict with the First or Second Law, in the case, to rescue a child or a young man, commits a mistake, and rescues the man. With it is illustrated, that the simple usage of the text-based rules, in order to estimate a text, could lead a system to a fundamental, serious, unforgivable error in the field of the Artificial Intelligence.

The computer system of Artificial Intelligence of a cyborg or an android for the pointer-oriented object acquisition method for tangible treatment of information has minimum ten internal directives, that are defined by the computer system of Artificial Intelligence itself in a way of the thinking paradigm of the class-based model of OOP, furthermore the computer system operates in its working method with the abstract objects, that are classified also in a way of the thinking paradigm of the class-based model of OOP, in addition the computer system, itself, acquires the new classes of the abstract objects or assigns new abstract objects to the already existing classes, both in a way of the thinking paradigm of the class-based model of OOP. In the reality, it means that in the example of the film "I, Robot" with the computer system of Artificial Intelligence of a cyborg or an android two abstract objects, in the context of the corresponding associative objects (as well as with the corresponding subjective objects), of the class "Be" were fetched from the classification tree of the computer system:

"The child is a human",

"The young man is a human".

Therefore, the computer system of Artificial Intelligence of a cyborg or an android for the pointer-oriented object acquisition method for tangible treatment of information would at least ask: Whom should I help first?

The completely conceived computer system of Artificial Intelligence of a cyborg or an android, that receives generally more inputs-values e.g. with such an associative object as the associative object of a child, as well as that contains such information stored in its classification tree e.g., also an object of the class "Be":

"A child is our future", will definitely rescue the child with no question, no matter at which price as well as at the price of its own life.

There follow 6 sheets of drawings.

The invention claimed is:

1. A working method for treatment of abstract objects (the thought-substances) of the computer system of Artificial Intelligence of a cyborg or an android for the pointer-oriented object acquisition method for tangible treatment of information of this system based on one natural language; with which the received signal-reaction of the computer system of Artificial Intelligence of a cyborg or an android, the corresponding association of the computer system of Artificial Intelligence of a cyborg or an android and the corresponding thought of the computer system of Artificial Intelligence of a cyborg or an android which are physically substantiated in the computer system are the corresponding objects of the same class; with which the abstract object (the thought to the association) knows only the corresponding associative object (the association to the received signal, or rather the association to the received signal-reaction) but does not know the corresponding subjective object (the received signal, or rather the received signal-reaction) and neither, certainly, the surroundings; with which the abstract object (the thought to the association) is unique according to the complete words combination of the vocabulary of both the associative words and the abstract words to the associative words, or rather to the corresponding association; with which the computer system treats the abstract object (the thought to the association) relative to time but not uniquely; with which a reference in another natural language to the abstract object (to the thought substance) is used for working method in the other natural language, characterized in that the computer system classifies by itself all the particular physical areas of the Random Access Memory (RAM) in each of which one abstract object (which is the thought substance to the corresponding association substance (to the corresponding associative object)) which points to not less than two words is stored in a way of the thinking paradigm of the class-based model of OOP only if the class of the objects is a verb in the one natural language.

2. The working method according to claim 1, characterized in that the computer system treats the abstract objects, as well as the classes of the objects, in a not continuous treatment mode, or rather discretely for each abstract object.

3. The working method according to claim 2, characterized in that the treatment of the abstract objects, as well as the classes of the objects, is impelled from, that the abstract object is compared with the other abstract objects.

4. The working method according to claim 3, characterized in that the decision, whether an abstract object is to be treated and how the abstract object is to be handled within the bounds of the determined treatment mode, is determined with the classes classification of the computer system of Artificial Intelligence of the cyborg or the android.

5. The working method according to claim 3, characterized in that the treatment mode is determined with the polymorphy of the classes classification of the computer system of Artificial Intelligence of the cyborg or the android.

6. The working method according to claim 3, characterized in that more than ten internal directives can be used by the working method of the computer system of Artificial Intelligence of a cyborg or an android.

7. The working method according to claim 6, characterized in that the relativity to time during this working method of the computer system of Artificial Intelligence of a cyborg or an android can be implemented as six weekdays and one holiday.

8. A computer system of Artificial Intelligence of a cyborg or an android for the working method for treatment of abstract objects (the thought substances) of this computer system based on one natural language; with which the received signal-reaction of the computer system of Artificial Intelligence of a cyborg or an android, the corresponding association of the computer system of Artificial Intelligence of a cyborg or an android and the corresponding thought of the computer system of Artificial Intelligence of a cyborg or an android which are physically substantiated in the computer system are the corresponding objects of the same class; with which the computer system defines the class of all the three objects as an action in the one natural language; with which the sensor network of the computer system summarizes all reactions of all senses, or rather of all sense organs; with which the computer system provides for output the subjective object (the received signal, or rather the received signal-reaction) split according to the sensor groups, characterized in that the computer system of Artificial Intelligence of the cyborg or the android is assembled from the module of the associative subjectivity and the module of the abstract subjectivity.

9. The computer system according to claim 8, characterized in that the abstract objects, as well as the classes of the objects, are defined and treated with the module of the abstract subjectivity of the computer system of Artificial Intelligence of a cyborg or an android in the one natural language.

10. A working method for treatment of abstract objects (the thought substances) of the computer system of Artificial Intelligence of a cyborg or an android for the pointer-oriented object acquisition method for tangible treatment of information of this system based on one natural language; with which the received signal-reaction of the computer system of Artificial Intelligence of a cyborg or an android, the corresponding association of the computer system of Artificial Intelligence of a cyborg or an android and the corresponding thought of the computer system of Artificial Intelligence of a cyborg or an android which are physically substantiated in the computer system are the corresponding objects of the same class; with which the abstract object (the thought to the association) knows only the corresponding associative object (the association to the received signal, or rather the association to the received signal-reaction) but does not know the corresponding subjective object (the received signal, or rather the received signal-reaction) and neither, certainly, the surroundings; with which the abstract object (the thought to the association) is unique according to the complete words combination of the vocabulary of both the associative words and the abstract words to the associative words, or rather to the corresponding association; with which the computer system treats the abstract object (the thought to the association) relative to time but not uniquely; with which a reference in another natural language to the abstract object (to the thought substance) is used for working method in the other natural language, characterized in that the computer system classifies by itself the class of an abstract object (which is the thought substance to the corresponding association substance (to the corresponding associative object)) which points to not less than two words in a way of the thinking paradigm of the class-based model of OOP only if the class of the objects is a verb in the one natural language.

* * * * *